United States Patent
Furuskog et al.

(10) Patent No.: US 9,736,823 B2
(45) Date of Patent: Aug. 15, 2017

(54) PREAMBLE SETS MATCHED TO UPLINK TRANSMISSION CONDITIONS

(71) Applicant: Telefonaktiebolaget L M Ericsson (publ), Stockholm (SE)

(72) Inventors: Johan Furuskog, Stockholm (SE); Mattias Frenne, Uppsala (SE); Qiang Zhang, Täby (SE); Henrik Sahlin, Mölnlycke (SE); Stefan Parkvall, Bromma (SE); Håkan Andersson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 14/401,763

(22) PCT Filed: Jun. 13, 2014

(86) PCT No.: PCT/SE2014/050715
§ 371 (c)(1),
(2) Date: Nov. 17, 2014

(87) PCT Pub. No.: WO2015/190961
PCT Pub. Date: Dec. 17, 2015

(65) Prior Publication Data
US 2016/0270058 A1  Sep. 15, 2016

(51) Int. Cl.
*H04W 4/00* (2009.01)
*H04W 72/04* (2009.01)
(Continued)

(52) U.S. Cl.
CPC ....... *H04W 72/0413* (2013.01); *H04L 1/0006* (2013.01); *H04W 74/0833* (2013.01)

(58) Field of Classification Search
CPC .......... H04W 72/0413; H04W 74/0833; H04L 1/0006
See application file for complete search history.

(56) References Cited

U.S. PATENT DOCUMENTS 9,356,740 B2 * 5/2016 Zhong ............... H04W 74/0833
2005/0025041 A1 * 2/2005 Marsili ................. H04L 25/062
370/208

(Continued)

FOREIGN PATENT DOCUMENTS

WO 2008038958 A2 4/2008
WO 2010002303 A1 1/2010

OTHER PUBLICATIONS

International Search Report and Written Opinion for PCT/SE2014/050715, mailed Feb. 26, 2015, 11 pages.
(Continued)

*Primary Examiner* — Abdelnabi O Musa
(74) *Attorney, Agent, or Firm* — Withrow & Terranova, PLLC

(57) ABSTRACT

The present disclosure relates to random access in wireless communication systems, and in particular to transmitting, receiving, and detecting preamble sequences. A method in a wireless device for transmitting a preamble sequence to a network node is disclosed. The method comprises configuring a number of preamble sequences into two or more preamble sets, wherein each preamble set is associated with at least one respective uplink transmission condition; determining a transmission condition of an uplink from the wireless device to the network node; and selecting one out of the two or more preamble sets based on the determined transmission condition to be a selected preamble set, and a preamble sequence from the selected preamble set to be a selected preamble sequence; as well as transmitting the selected preamble sequence on the uplink.

31 Claims, 12 Drawing Sheets

(51) Int. Cl.
*H04L 1/00* (2006.01)
*H04W 74/08* (2009.01)

(56) References Cited

U.S. PATENT DOCUMENTS

| | | | | |
|---|---|---|---|---|
| 2007/0230600 A1* | 10/2007 | Bertrand | ................ | H04J 13/00 |
| | | | | 375/260 |
| 2007/0291696 A1* | 12/2007 | Zhang | ..................... | H04L 5/023 |
| | | | | 370/331 |
| 2011/0158104 A1* | 6/2011 | Frenger | ............. | H04W 74/0833 |
| | | | | 370/241 |
| 2013/0215852 A1* | 8/2013 | Noh | .................... | H04W 74/004 |
| | | | | 370/329 |
| 2014/0098761 A1* | 4/2014 | Lee | .................... | H04W 74/006 |
| | | | | 370/329 |

OTHER PUBLICATIONS

Ericsson, "R1-140743: Random access for enhanced coverage MTC UE," 3rd Generational Partnership Project (3GPP), TSG RAN WG1 Meeting #76, Feb. 10-14, 2014, Prague, Czech Republic, 3 pages.
Author Unknown, "Technical Specification Group Radio Access Network; Evolved Universal Terrestrial Radio Access (E-UTRA); Physical Channels and Modulation (Release 11)," Technical Specification 36.211, Version 11.3.0, 3GPP Organizational Partners, Jun. 2013, 108 pages.
Author Unknown, "Technical Specification Group Radio Access Network; Evolved Universal Terrestrial Radio Access (E-UTRA); Physical layer procedures (Release 11)," Technical Specification 36.213, Version 11.3.0, 3GPP Organizational Partners, Jun. 2013, 176 pages.

\* cited by examiner

PREAMBLE SETS MATCHED TO UPLINK TRANSMISSION CONDITIONS

This application is a 35 U.S.C. §371 national phase filing of International Application No. PCT/SE2014/050715, filed Jun. 13, 2014, the disclosure of which is incorporated herein by reference in its entirety.

TECHNICAL FIELD

The present disclosure relates to random access in wireless communication systems, and in particular to transmitting, receiving, and detecting preamble sequences.

BACKGROUND

The fourth generation, 4G, wireless access within the 3rd generation partnership project, 3GPP, long-term evolution, LTE, is based on orthogonal frequency-division multiplexing, OFDM, in downlink and discrete Fourier transform, DFT, spread OFDM, also known as single-carrier frequency-division multiple access, SC-FDMA, in uplink, UL. Here, the UL physical channels consist of the physical uplink shared channel, PUSCH, the physical uplink control channel, PUCCH, and the physical random-access channel, PRACH, as well as of physical signals referred to as the demodulation reference signal, DRS, and the sounding reference signal, SRS.

In UL, PRACH is used for initial access by wireless devices wishing to access the communication system. The PRACH is also used for estimating timing offset between a wireless device and the base station, eNB, or network node, which receives the PRACH. A description of this procedure is given in 3GPP TS 36.213, V11.3.0. Upon reception in, e.g., the eNB, the PRACH must thus be detected with high accuracy and accurate timing offset estimation must be done.

With reference to FIG. 2, when a wireless device uses the PRACH, it transmits a so-called random-access preamble sequence in a known time/frequency resource 104 in the OFDM grid 105.

An illustration of PRACH signaling, as specified for LTE, see, e.g., 3GPP TS 36.211, V11.3.0, is shown in FIG. 2. Here four different formats, shown in FIG. 2 as format 0 through format 3, are specified where a PRACH preamble consists of one or two preamble sequences, each of length 24 576 samples. These preambles have a cyclic prefix, CP, of length between 3 168 and 21 024 samples for format 0 to 3. A fifth format, shown as format 4 in FIG. 2, is specified for time-division duplex, TDD, systems.

A long preamble sequence potentially carries more signal energy than a shorter sequence. Long preamble sequences can therefore in some cases be easier to detect when received with noise, since increased received signal energy allows for increased detector sensitivity. However, in general, the longer the preamble sequence, the larger is also the detection delay, as well as the sensitivity to the coherence time of the radio-propagation channel over which the preamble sequence has propagated. A problem then, is how to balance detector sensitivity with detection delay and sensitivity to channel coherence time in a random-access mechanism, such as the one used in the PRACH.

The illustration in FIG. 2 shows five different types of preamble sequence. A receiver configured to detect all allowable preamble sequences in parallel usually implements separate detectors for each type of preamble sequence. Therefore, in general, the larger the number of different preamble sequences is, the higher the preamble receiver complexity and processing requirements become. Thus, increasing the number of preamble sequences in a communication system drives receiver complexity and cost. A further problem then, is how to allow for an increased number and wider variety of preamble sequences in a communication system, while keeping processing requirements in the preamble sequence receiver reasonable.

The contribution R1-140743 to 3GPP TSG RAN WG1 Meeting #76 discusses random access using PRACH, and in particular a method in which a pre-determined preamble sequence is repeated in order to increase cell coverage. R1-140743 does not provide any solutions to the problems discussed herein.

Thus, there is a need for an improved PRACH signaling technique which balances detector sensitivity, detection delay, and sensitivity to channel coherence time in a random-access mechanism such as the one used in the PRACH while still keeping receiver processing requirements and complexity reasonable. It is an object of the present disclosure to provide solutions to, or at least mitigate, the above-mentioned deficiencies in the art.

SUMMARY

An object of the present disclosure is to provide at least a wireless device, a network node, and methods for transmitting and receiving random-access preamble signals, which seek to mitigate, alleviate, or eliminate one or more of the above-identified deficiencies in the art and disadvantages singly or in any combination.

This object is obtained by a method in a wireless device for transmitting a preamble sequence to a network node. The method comprises configuring a number of preamble sequences into two or more preamble sets, wherein each preamble set is associated with at least one respective uplink transmission condition. The method also comprises determining a transmission condition of an uplink from the wireless device to the network node, and also selecting one out of the two or more preamble sets based on the determined transmission condition to be a selected preamble set, and a preamble sequence from the selected preamble set to be a selected preamble sequence. The method further comprises transmitting the selected preamble sequence on the uplink.

Thus, by embodiments of the present disclosure, random access and other related mechanisms are performed by transmission of a preamble sequence selected based on current uplink transmission conditions. Consequently, to exemplify, unfavorable transmission conditions in terms of, e.g., signal-to-noise ratio, SNR, can be compensated for by selecting an appropriate preamble sequence suitable for the unfavorable transmission conditions, e.g., a longer preamble sequence carrying enough signal energy to overcome a poor SNR. Likewise, favorable transmission conditions in terms of SNR can be exploited by selecting a shorter preamble sequence associated with shorter detection delay.

Thus, a balance between detector sensitivity, detection delay and also sensitivity to channel coherence time in a random access mechanism is obtained.

Furthermore, the combinations of transmission conditions and preamble sequences that preamble sequence detectors in the network node must attempt to detect is reduced by the present teaching. This reduces processing requirements in the network node, while maintaining the advantage of having several detectors tailored to different transmission conditions available in the network node, since each detector only has to search for a smaller number of preamble sequences.

According to some aspects, each preamble set is further associated with at least one respective preamble sequence processing capability and/or detector implementation of the network node.

Thus, herein, uplink transmission conditions in some aspects comprise preamble sequence processing capability and/or detector implementation of the network node configured to receive the transmitted preamble sequence.

This feature provides additional advantages in that the preamble sequence transmission can be adapted to the actual preamble sequence processing capability and/or detector implementation of the network node. To exemplify; some network nodes will have receiver architectures such that the network nodes will not be able to benefit fully from all types of preamble sequences, in which case some preamble sequences are superfluous.

Furthermore, a wireless device can select a preamble sequence associated with a given detector, thus optimizing the probability of detection for some given transmission conditions, while still maintaining the advantages of each detector only having to search for a smaller number of preambles.

According to some aspects, the method in the wireless device further comprises receiving information from the network node related to the transmission condition of the uplink.

This additional feature brings the additional advantage of more accurate determination, by the wireless device, of transmission conditions on the uplink.

Furthermore, by this additional feature the network node is given the possibility to influence the selection of preamble sequence set.

According to some other aspects, the method further comprises retrieving information related to the transmission condition of the uplink.

Thus, the wireless device according to some aspects obtains information related to the uplink transmission condition from alternative sources other than the network node. This reduces the need for receiving information from the network node in order to determine transmission conditions on the uplink.

According to some further aspects, the configuring comprises assigning a respective power ramping scheme to each of the two or more preamble sets, and the transmitting comprises transmitting the selected preamble sequence according to the respective power ramping scheme of the selected preamble set.

Consequently, according to aspects, preambles associated with different detectors have different power-ramping schemes, thus optimizing the usage of power and communication resources for the transmission condition or conditions for which a particular detector is designed.

According to aspects, the configuring further comprises re-configuring an existing configuration of preamble sequences into new preamble sets based on a received re-configuration command.

In this way, the use of specific preamble sequences in a cell of a network, or in a part of the network can be controlled and thus also optimized.

According to some aspects, the selecting further comprises selecting a preamble set based on a list of allowable preamble sequences, and/or based on a list of allowable combinations of transmission conditions and preamble sequences.

This allows for a further control of the random access mechanism in a network, in that some preamble sequences, or some combinations of preamble sequences and transmission conditions, may be preferred in some scenarios and rejected in other scenarios.

According to further aspects, at least one of the preamble sequences comprises a concatenation in time of one or more identical short sequences, each of the short sequences having a same time duration as an orthogonal frequency-division multiplexing, OFDM, symbol used for carrying data traffic in a radio access network of the wireless device.

Thus, by the present technique, the same size FFT implementation can be used both for processing 'regular' OFDM symbols carrying, e.g., data traffic, and for processing random access preamble sequences. Thus, there is no longer a need for use of a special dedicated FFT for receiving preamble sequences.

The object is also obtained by a method in a network node for receiving and detecting a preamble sequence transmitted over an uplink from a wireless device to the network node, wherein the preamble sequence belongs to one out of two or more preamble sets. The method comprises configuring, for each preamble set, a detector for detecting a preamble sequence belonging to the preamble set. Each preamble set is associated with at least one respective transmission condition of the uplink. The method also comprises receiving a radio signal from the wireless device over the uplink comprising the preamble sequence, and also detecting the preamble sequence by the configured detectors.

The object is further obtained by a wireless device arranged to transmit a preamble sequence to a network node. The wireless device comprises a set partitioning module arranged to configure a number of preamble sequences into two or more preamble sets, wherein each preamble set is associated with at least one respective uplink transmission condition. The wireless device also comprises a transmission condition determining module arranged to determine a transmission condition of an uplink from the wireless device to the network node, as well as a preamble set selection module arranged to select one out of the two or more preamble sets based on the transmission condition to be a selected preamble set, and a preamble sequence from the selected preamble set to be a selected preamble sequence. The wireless device further comprises a communication interface arranged to transmit the selected preamble sequence on the uplink.

The object is furthermore obtained by a network node arranged to receive and to detect a preamble sequence transmitted over an uplink from a wireless device to the network node. The preamble sequence belongs to one out of two or more preamble sets. The network node comprises one or more detectors configured to detect preamble sequences belonging to respective preamble sets. Each preamble set is associated with at least one respective transmission condition of the uplink. The network node also comprises a communication interface arranged to receive a radio signal from the wireless device, over the uplink, comprising the preamble sequence.

There is further provided herein computer programs comprising computer program code which, when executed in a preamble receiver or in a wireless device, causes the preamble receiver or wireless device, respectively, to execute a method according to the present teaching.

The computer programs, the wireless device, and the network node, display advantages corresponding to the advantages already described in relation to the methods.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
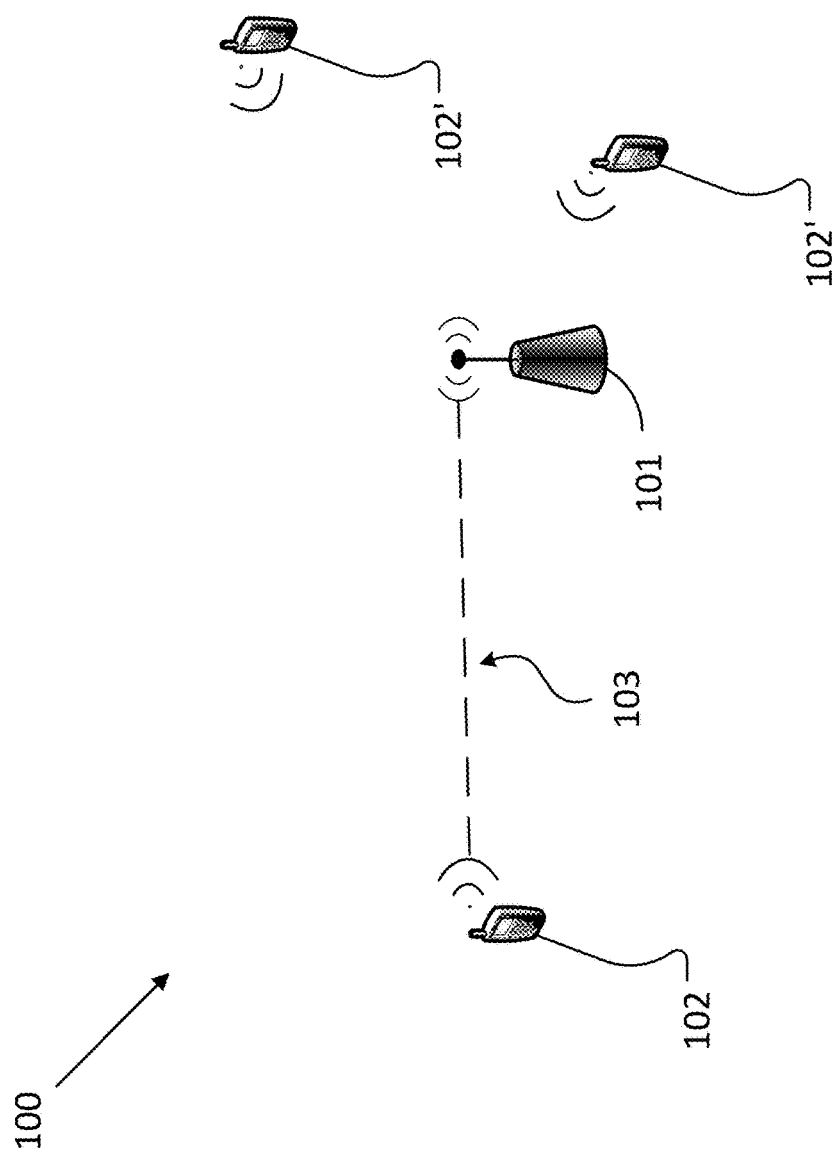
FIG. 1 is a schematic overview of a radio access network.

Aspects of the present disclosure will be described more fully hereinafter with reference to the accompanying drawings. The apparatus, computer program and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The present teaching relates to selecting preamble sequences for use in random access based on a transmission condition of an uplink from a wireless device to a network node, and according to aspects also based on a preamble sequence processing capability and/or detector implementation of a network node arranged to receive the transmitted preamble sequence.

In the setting of LTE, see, e.g., 3GPP TS 36.211, V11.3.0, the present teaching proposes to divide a number of available preambles for a given PRACH resource allocation into two, or more, distinct sets. Each set is then associated with one or more transmission conditions and/or PRACH detection procedures.

The technique disclosed herein is embodied by method steps in a wireless device, described in connection to FIG. 6 below, and also by method steps in a network node, described in connection to FIG. 7 below. The technique is furthermore embodied by a wireless device and by a network node, respectively described in connection to FIGS. 9 and 12 below.

However, before entering into a description of FIGS. 6-12, a system overview and introduction to the present technique will be given in connection to FIGS. 1-5, where also aspects of a proposed preamble format will be described, following the below list of abbreviations.

ABBREVIATIONS

3GPP 3rd Generation Partnership Project
4G Fourth Generation
5G Fifth Generation
DFT Discrete Fourier Transform
DL Downlink
DRS Demodulation reference signal
FDD Frequency-Division Duplex
FFT Fast Fourier Transform
IDFT Inverse Discrete Fourier Transform
IFFT Inverse Fast Fourier Transform
LTE Long-Term Evolution
MF Matched Filter
OFDM Orthogonal frequency-division multiplexing
PBCH Physical broadcast channel
PRACH Physical random-access channel
PRB Physical Resource Block
PSS Primary Synchronization Signal
PUCCH Physical uplink control channel
PUSCH Physical uplink shared channel
SC Sub-Carrier
SC-FDMA Single Carrier-Frequency-Division Multiple Access
SNR Signal-to-Noise Ratio
SRS Sounding Reference Signal
SSS Secondary Synchronization Signal
TDD Time-Division-Duplex
UL Uplink
ZC Zadoff-Chu System Overview and Introduction FIG. 1 is a schematic overview of a radio access network 100 with wireless devices 102, 102' and a network node 101 or base station such as an eNB. One of the wireless devices 102 is performing random access to the network node 101 and is thus transmitting signals over an uplink 103 from the wireless device 102 to the network node 101. In case of an LTE-based radio access network 100, the random access is performed over the PRACH. Random access in LTE, and also in other radio technologies, is used both to facilitate initial access for a wireless device 102 into a radio access network 100 and also for timing offset estimation between wireless device 102 transmissions and reception at the network node 101.

Figure 2:
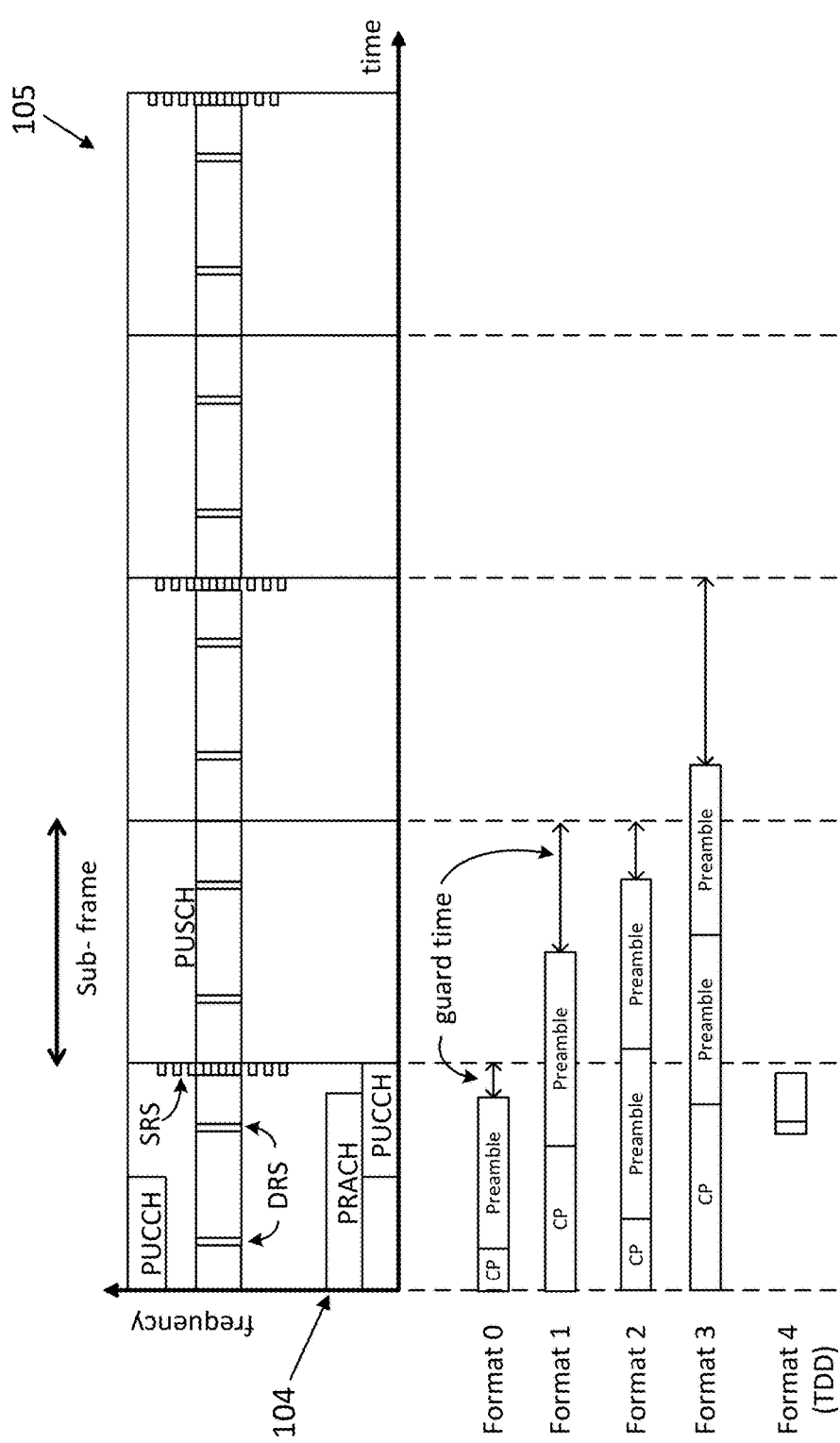
FIG. 2 schematically illustrates signaling in a radio access network.

FIG. 2 schematically illustrates signaling in a radio access network, such as the radio access network 100 shown in FIG. 1, according to prior art. When a wireless device, such as the wireless device 102 shown in FIG. 1, uses the PRACH, it transmits a so-called random-access preamble sequence, or preamble sequence for short, in a known time/frequency resource 104 in the OFDM grid 105.

An illustration of preamble formats, as specified for LTE, see, e.g., 3GPP TS 36.211, V11.3.0, is shown in FIG. 2. Four different formats, shown in FIG. 2 as format 0 through format 3, are specified where a PRACH preamble consists of one or two preamble sequences, each of length 24 576 samples. These preambles have a cyclic prefix, CP, of length between 3 168 and 21 024 samples for format 0 to 3. A fifth format, shown as format 4 in FIG. 2, is specified for time-division duplex, TDD, systems.

It is noted that the present teaching can be applied with any preamble format or group of formats. However, there is one class of preamble formats which the present teaching is especially advantageous to apply in combination. This class of preamble formats will now be described.

Preamble Format Based on Concatenation of Identical Short Sequences

In LTE, and also in other radio access technologies, the FFT used for processing PRACH is often larger than the FFT used to process 'regular' OFDM symbols, such as the symbols in the PUSCH. This large FFT drives complexity and power consumption in many systems, and potentially also increases the need for cooling of receivers in, e.g., network nodes.

Figure 3:
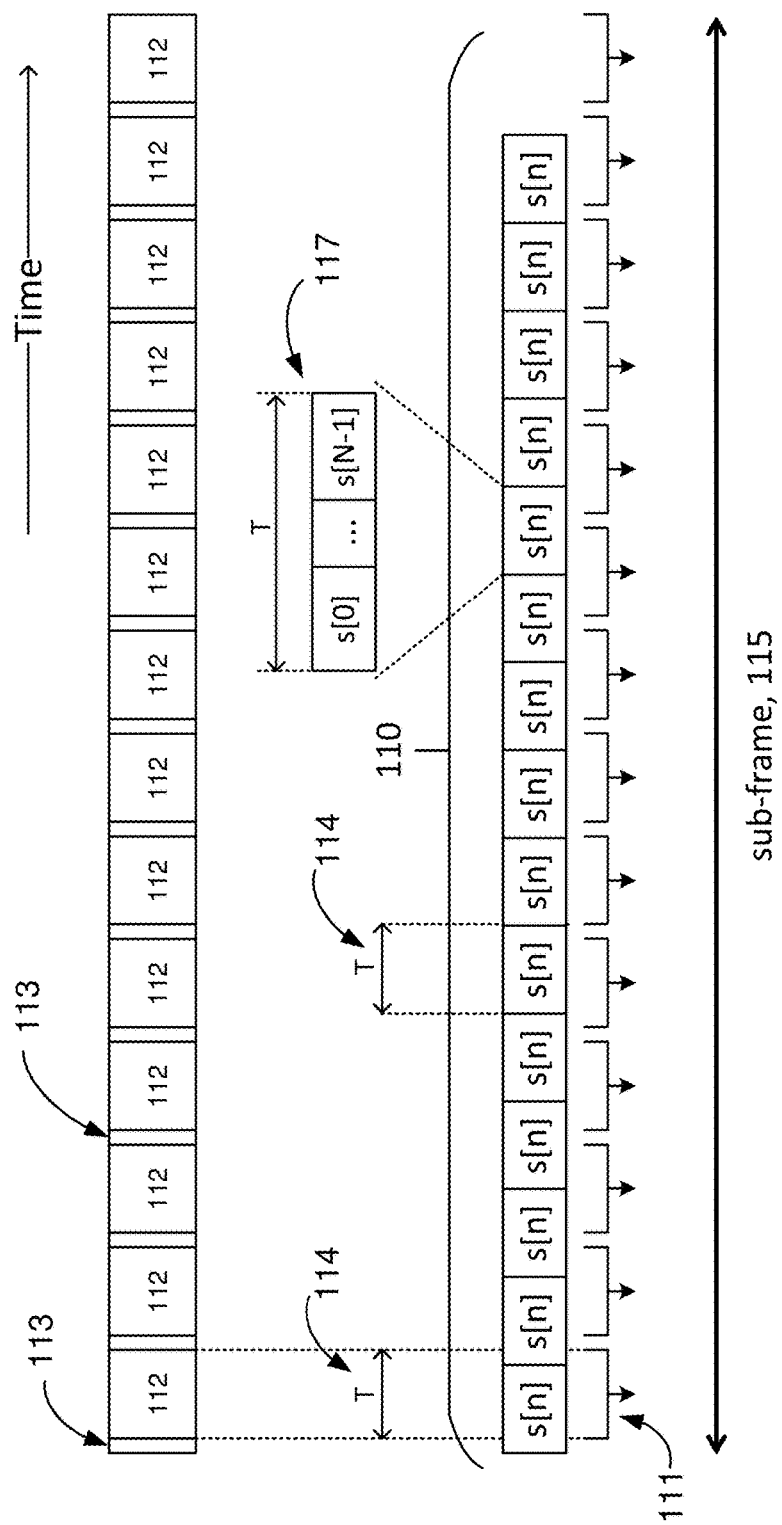
FIG. 3 schematically illustrates a preamble sequence for random access.

In order to avoid using this dedicated large FFT used to detect preamble sequences, it is proposed herein, as illustrated in FIG. 3, to generate a short sequence s[n] having the same length or time duration T as the length of the regular OFDM symbols 112 that are used for other physical channels, such as the physical channels used for user data, control signaling, and reference signals. A preamble sequence 110 can then be constructed by repeating the short sequence a number of times to generate a preamble sequence 110.

The preamble sequence 110 thus obtained can be used for a variety of purposes, including but not limited to initial access, handover, scheduling requests, and resynchronization.

With reference to FIG. 3, a preamble sequence 110, or preamble format, is proposed herein in which FFT windows 111 of the same size as used for other uplink channels, e.g., PUSCH, and signals, e.g., DMRS, SRS, can be used during detection of the preamble. Thus, no dedicated special FFT window needs to be implemented in order to detect the preamble sequence.

The proposed preamble sequence 110 is based on one or more concatenated short sequences, s[n]. Each such short sequence 117 has the same time duration T 114 as the length of the OFDM symbols 112 used for all other physical channels, not counting the cyclic prefixes 113. The preamble sequence 110 is constructed by repeating the short sequence s[n] a number of times over one or more sub-frames 115. Consequently, the short sequence s[n] used to construct the preamble sequence works as a cyclic prefix to its neighbors, as will be further detailed below.

The short sequence can, e.g., be constructed by using Zadoff-Chu sequences. The Zadoff-Chu sequences are a special instance of the more general constant amplitude— zero autocorrelation, CAZAC, sequences. The short sequence can also be made up in some other fashion; the main property being that is has equal length as the 'regular' OFDM symbols 112 of the system.

The length of the preamble sequence can easily be adjusted by varying the number of short sequences s[n] used in the preamble sequence 110. Among other things, this allows for matching of a preamble sequence to a given transmission condition, such as a signal-to-noise-ratio, SNR, or a channel coherence time, of an uplink radio channel from a wireless device to a network node.

Consequently, according to aspects of the present teaching, at least some of the preamble sequences discussed herein comprise a concatenation in time of one or more identical short sequences s[n], each of the short sequences having a same time duration T as an orthogonal frequency-division multiplexing, OFDM, symbol 112 used for carrying data traffic in a radio access network 100 of the wireless device 102, 102a. However, it is observed that the present teaching can be applied to any type of preamble sequence, not limited to the type constructed from said short sequences.

Figure 4A:
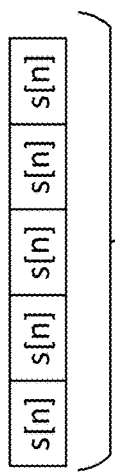
FIG. 4 schematically illustrates preamble sequences for random access.
Figure 4B:
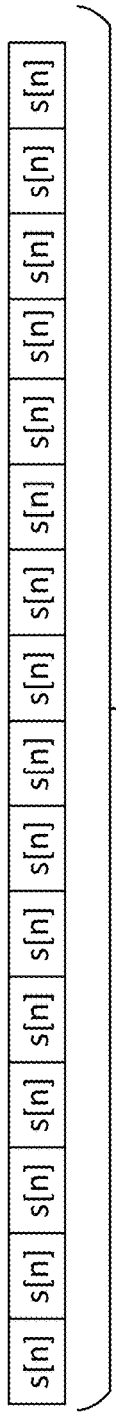

FIGS. 4a and 4b illustrate examples of preamble sequences 110a, 110b having different length due to that the number of included short sequences differs.

An inconvenience of using a preamble sequence constructed from identical short sequences s[n] is that the arrival time estimate of the preamble sequence becomes ambiguous in some cases, such as when the propagation delays in the radio access network can be expected to be large, i.e., in excess of the time duration T of the short sequence s[n].

This is because the arrival time estimate is in some cases limited to the time duration T of the short sequence s[n]. This effect results from the periodic nature of the preamble sequence, and is referred to herein as arrival time ambiguity. In other words, the arrival time can only be estimated up to the time duration T of the short sequence by an estimator of arrival time which only considers the individual short sequences s[n]. If there is prior information regarding a maximum propagation delay $t_p$<T in a network, then this ambiguity does not present a problem. However, in a network with larger cells where potentially $t_p$>T, then this ambiguity can become an inconvenience.

Figure 4C:
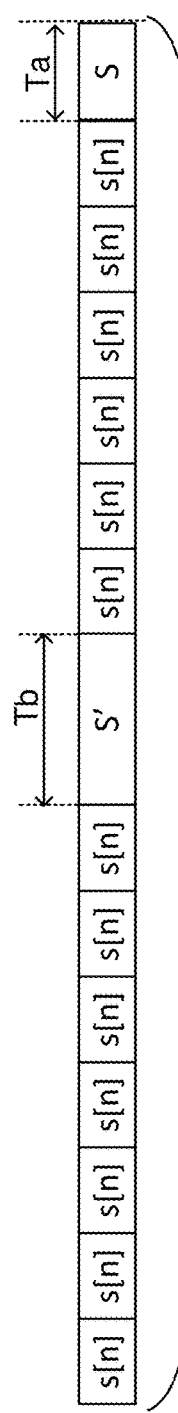

Because of this time ambiguity inconvenience, preamble sequence formats are proposed herein which facilitates estimation of arrival times larger than the length of the short sequence s[n]. These sequences comprise one or more special symbols S, S', different from the short sequences, referred to herein as offset indicator sequences. These offset indicator sequences S, S' are illustrated in FIG. 4c. The offset indicator sequences enable a preamble receiver of the preamble sequence 110c to resolve the arrival time ambiguity and thus reliably estimate arrival time in cells having propagation delays that can exceed the time duration T of the short sequence s[n]. The offset indicator sequences, according to some aspects, appear as gaps in the preamble sequence. However, in other aspects, the offset indicator sequences take on any amplitude or phase trajectory, as long as they are different in some way from the short sequences s[n]. The reason that the offset indicator sequences need to be different from the short sequences s[n] is that, if they are different from the short sequences, then they can be distinguished from the short sequences s[n], and thus the arrival time ambiguity can be resolved.

The offset indicator sequences are, according to aspects, referred to as offset indicator symbols. Thus, herein, the terms offset indicator sequence and offset indicator symbol are equivalent.

Thus when selecting between, e.g., the preamble sequences illustrated in FIGS. 4a-4c, a cell size of the radio access network 100, or a maximum propagation delay of the radio access network 100 can be considered.

Figure 4D:
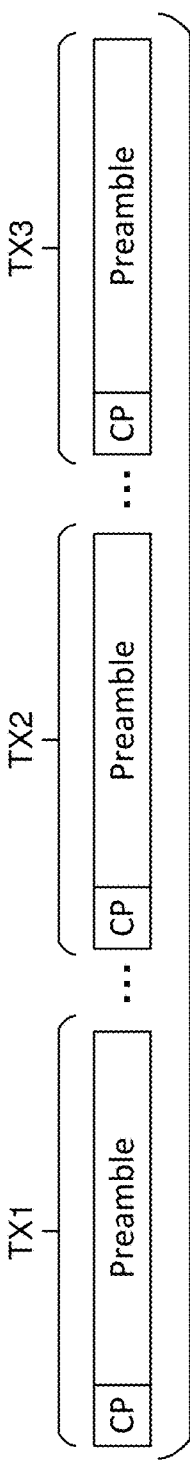

FIG. 4d illustrates other aspects of preamble sequences, in which sequentially transmitted preamble sequences 110d are transmitted with different transmitter configurations TX1, TX2, TX3. One example of such transmitter configurations is an increased transmit power setting, wherein the sequence TX1, TX2, TX3 represents a power ramping scheme.

Figure 5:
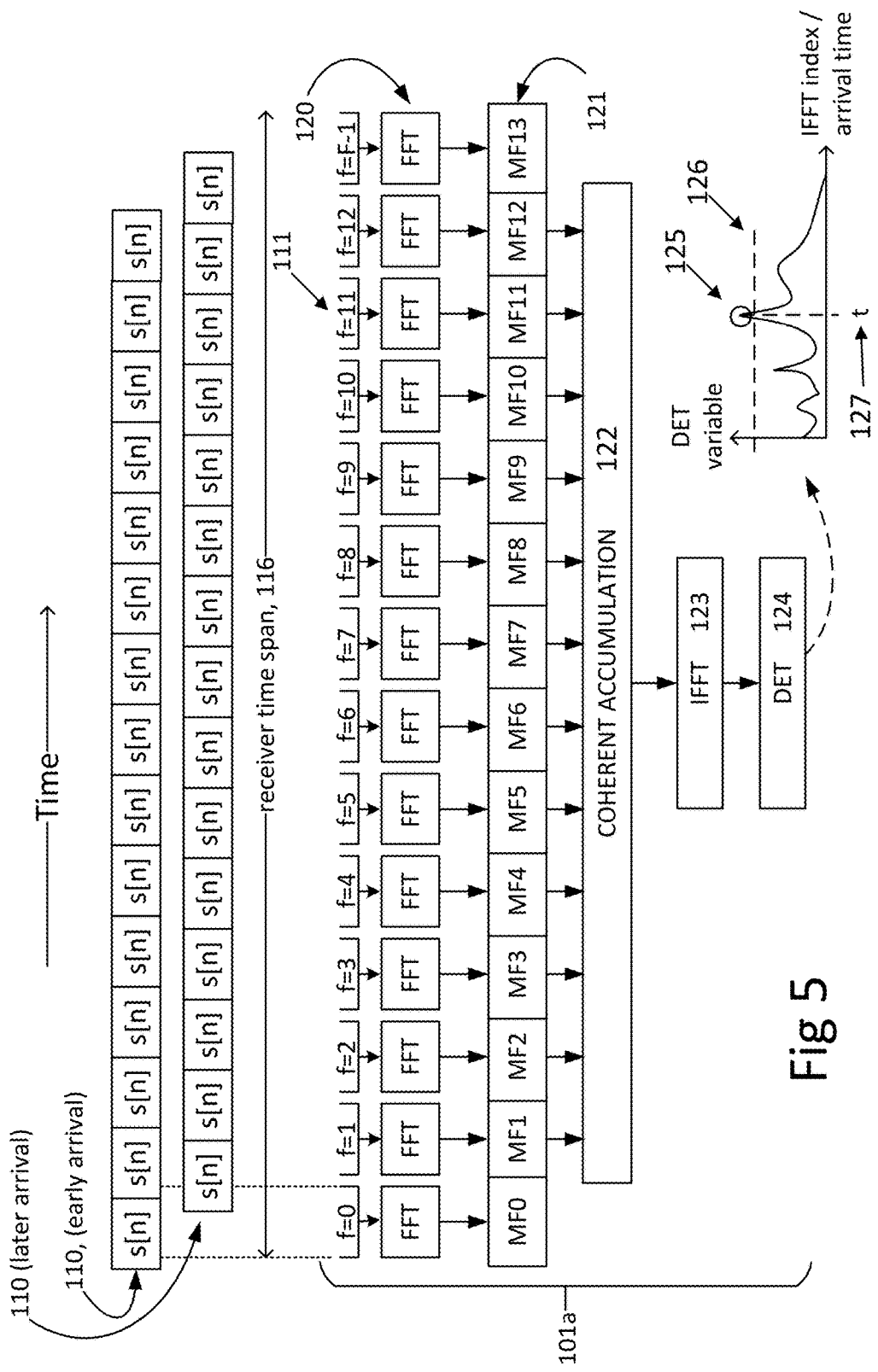
FIG. 5 is a block diagram illustrating aspects of a preamble receiver.

FIG. 5 is a schematic block diagram illustrating aspects of a preamble receiver 101a arranged to receive and to detect the type of preamble sequences described above based on repetition of short sequencers s[n]. The preamble receiver 101a is according to some aspects arranged in a network node 101 to receive digitized samples of a radio signal received by the network node 101. The preamble sequences 110 shown in FIGS. 4a-4d are examples of such digitized samples. The preamble receiver 101a monitors the received samples over a receiver time span 116, by a number F of FFT windows 111, and attempts to detect the presence of a preamble signal in the receiver time span 116 by FFT processing 120 of the FFT windows.

Each FFT 120 is followed by a matched filter, MF, 121 which is calculated based on a cyclic shift of the short sequence s[n]. This cyclic shift is determined based on the delay of the respective FFT window in relation to other FFT windows. The output vectors from the matched filters are added coherently 122 and then processed in an inverse FFT, IFFT 123, resulting in a time-domain vector.

According to aspects, a preamble sequence is detected by the preamble receiver detector 124 if a maximum value 125 of the time-domain vector, e.g., in terms of absolute or squared value of the time-domain vector, exceeds a predetermined threshold value 126.

By searching for the location t 127 of this maximum value in the time-domain vector by the detector 124, an arrival time t of the preamble sequence can be estimated. This arrival time estimate equals the sample position in the vector of said maximum value, divided by the length of the inverse FFT size and multiplied by the length of the short sequence in seconds.

Proposed Method in a Wireless Device

Figure 6:
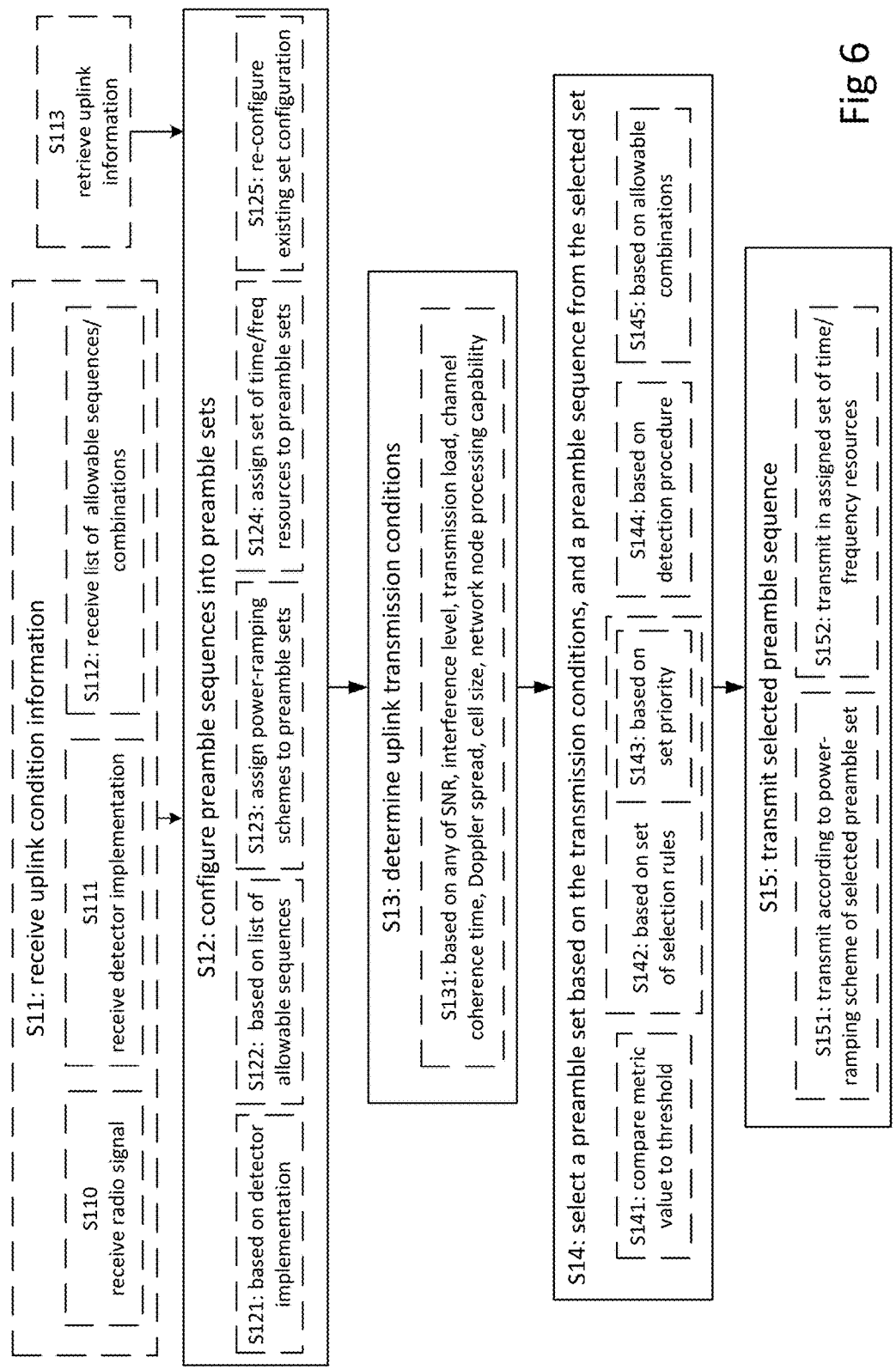
FIG. 6 is a flowchart illustrating embodiments of method steps in a wireless device.

FIG. 6 is a flowchart illustrating embodiments of method steps in a wireless device. In particular, there is illustrated a method in a wireless device 102, 102a for transmitting a preamble sequence to a network node 101. The method comprises configuring S12 a number of preamble sequences into two or more preamble sets, wherein each preamble set is associated with at least one respective uplink transmission condition.

In this way, the wireless device 102 obtains preamble sets which are associated or matched to different transmission conditions. As will become clear from the below description of the different aspects of the proposed method, transmission condition is herein interpreted broadly to encompass a wide variety of transmission conditions from uplink SNR to detector implementation and also geographical aspects of the radio access network 100 such as cell size.

The method also comprises determining S13 a transmission condition of an uplink 103 from the wireless device 102, 102a to the network node 101, and selecting S14 one out of the two or more preamble sets based on the determined transmission condition to be a selected preamble set, and a preamble sequence from the selected preamble set to be a selected preamble sequence.

In addition, the method comprises transmitting S15 the selected preamble sequence on the uplink 103.

To exemplify; should transmission conditions on said uplink involve a short coherence time channel or a high signal-to-noise ratio, SNR, then a preamble set comprising shorter preamble sequences can be selected in order to facilitate detection of the preamble sequence. Similarly, in case uplink SNR is determined to be low, and/or the uplink coherence time is determined to be long, a preamble set comprising longer preamble sequences carrying more energy can be selected in order to ensure detection of the preamble sequence.

Thus, a balance between detector sensitivity, detection delay and sensitivity to channel coherence time in a random access mechanism of a radio access network is obtained.

According to some aspects, each preamble set is further associated with at least one respective preamble sequence processing capability and/or detector implementation of the network node 101. Thus, by associating preamble sets with implementation aspects of a network node, a further optimization can be obtained by selecting preamble set based on a current receiver or network node implementation.

Consequently, the configuring S12, according to aspects, comprises configuring S121 the preamble sequences into preamble sets based on a preamble sequence processing capability, and/or a detector implementation, of the network node 101.

In order to facilitate determining the uplink transmission condition, the method according to aspects further comprises receiving S11 information from the network node 101 related to the transmission condition of the uplink 103.

This receiving S11, according to some aspects, comprises receiving S110 a radio signal from the network node 101. Then, based on the received radio signal, a wide variety of different transmission conditions of the uplink can be determined by the wireless device, either directly from information comprised in the radio signal, or indirectly by estimating transmission conditions on the uplink based on properties of the received radio signal.

Examples of transmission conditions that can be determined indirectly from the received radio signal include signal-to-noise ratio, SNR, channel coherence time, and Doppler spread condition of the uplink. The uplink and the downlink are often assumed to be reciprocal in some respects. Thus, if a radio signal with high Doppler is received over a downlink from a network node, then it, according to some aspects, is assumed that a high Doppler will be present also on the uplink 103 from the wireless device 102 to the network node 101.

Herein, transmission conditions are interpreted as to also include transmitter and receiver implementation. In order for the wireless device to obtain knowledge about properties of the receiving network node, such as a preamble sequence processing capability and/or a detector implementation of the network node 101, the receiving S11, according to aspects, comprises receiving S111 a message from the network node 101 comprising information related to a preamble sequence processing capability and/or a detector implementation of the network node 101.

Furthermore, according to some aspects, the method comprises receiving S112 a list of allowable preamble sequences, and/or a list of allowable combinations of transmission conditions and preamble sequences, from the network node 101.

These aspects of the method allow the network node, or an operator of the network node, to control and/or tune the random access mechanism in the radio access network. The list of allowable preamble sequences can be updated by the operator to reflect a change in, e.g., network architecture. Further, by setting different combinations of transmission conditions and preamble sequences to be allowable, and some combinations to not be allowable, random access can be solicited or rejected depending on specific scenarios.

To exemplify; suppose a network node is located at a gas station beside a free-way. The network node is configured specifically to service wireless devices of users which stop at the gas station, and does not have capacity to service wireless devices passing with high speed on the free-way. In this scenario, a network operator can configure the list of allowable combinations of transmission conditions and preamble sequences to not include any combinations involving high Doppler, indicating that the vehicle is not stopping at the gas station.

Consequently, the configuring S12, according to aspects, comprises configuring S122 the preamble sequences into preamble sets based on a list of allowable preamble sequences, and/or based on a list of allowable combinations of transmission conditions and preamble sequences, and the selecting S14 further comprises selecting S145 a preamble set based on a list of allowable preamble sequences, and/or based on a list of allowable combinations of transmission conditions and preamble sequences.

Apart from directly or indirectly determining uplink transmission conditions from a received radio signal, uplink transmission conditions can also be determined from other sources. Thus, according to aspects, the method further comprises retrieving S113 information related to the transmission condition of the uplink 103.

According to one such aspect, the information retrieved relates to a cell size of the radio access network 100, a location of the network node 101, or a maximum propagation delay of the radio access network 100.

According to another such aspect, the information retrieved relates to an uplink transmission condition determined by another wireless device 102' and stored in a repository of uplink transmission conditions of the radio access network.

According to some aspects, the retrieving S113 comprises retrieving the information from a memory of the wireless device, while, according to some other aspects, the retrieving S113 comprises retrieving the information from a central repository of the radio access network 100.

In addition to associating preamble sets with transmission conditions, each preamble set is, according to aspects, also associated with one or more instructions regarding how the preamble sequences comprised in the preamble set should be transmitted.

To exemplify; a given preamble sequence set may be matched to an uplink transmission condition with an SNR that is difficult to accurately determine. In this case, preamble sequences can be transmitted with increasing power until random access succeeds.

Thus, the configuring S12, according to aspects, comprises assigning S123 a respective power ramping scheme to each of the two or more preamble sets. The transmitting S15 then comprises transmitting S151 the selected preamble sequence according to the respective power ramping scheme of the selected preamble set.

The preamble sets can also be associated with different communications resources, such as specific time/frequency resources in an OFDM grid 105. Thus, according to some aspects, the configuring S12 further comprises assigning S124 a respective set of time/frequency resources to each of the two or more preamble sets. The transmitting S15 then comprises transmitting S152 the selected preamble sequence in the set of time/frequency resources assigned to the selected preamble set.

During operation, a network node 101 or other network entity may discover that some of the allowable preamble sequences are over-utilized, i.e., that wireless devices use a sub-set of the allowable preamble sequences more frequently than some other preamble sequences which are under-utilized. In this case, network performance, and random access performance in particular, can be improved by re-configuring the preamble sets such that, e.g., some often selected sets are expanded with additional preamble sequences.

Thus, according to some aspects, the configuring S12 further comprises re-configuring S125 an existing configuration of preamble sequences into new preamble sets based on a received re-configuration command.

The re-configuration command is, according to some aspects, transmitted to the wireless device from the network node. According to some other aspects, the re-configuration command is transmitted to the wireless device from a network entity in the radio access network 100 different from the network node 101.

As already mentioned, transmission condition is herein interpreted broadly. Thus, to exemplify, the determining S13, according to aspects, comprises determining S131 the transmission condition as a transmission condition metric value based on any of:

a signal-to-noise ratio, SNR, condition of the uplink 103;
an interference level condition of the uplink 103;
a transmission load condition of the uplink 103;
a channel coherence time condition of the uplink 103;
a Doppler spread condition of the uplink 103;
a cell size of a cell of the network node 101;
a preamble sequence processing capability of the network node 101; and
a detector implementation of the network node 101.

Interference level is related to the signal-to-interference-and-noise ratio, SINR, on the uplink 103, while transmission load, according to aspects, relates to more coarse metrics such as a number of active users in a cell of the network node 101, a number of active users with uplink grants. The transmission load condition of the uplink thus relates to a collision probability of transmitted preamble sequences. Given a high collision probability, preamble sets comprising short preamble sequences are, according to aspects, selected in order to avoid collision.

Herein, channel coherence time comprises Doppler effects, but also fast fading in the uplink channel.

Given one or more of the above transmission condition metric values, the selecting S14, according to aspects, comprises comparing S141 the determined transmission condition metric value to one or more thresholds of the preamble sets.

The actual selection of preamble set based on transmission conditions can, according to different aspects, be done in different ways. According to some of these aspects, the selecting S14 further comprises selecting S142 a preamble set based on a pre-determined set of preamble set selection rules. These preamble selection rules according to different aspects, comprise preamble set priorities, i.e., given transmission conditions on the uplink, the wireless device can first decide on an allowable group of preamble sets. Any preamble set in this group would then have a reasonable chance of yielding a successful random access attempt. A preamble set from the group is then, according to aspects, selected as the set which has the highest preamble set priority in the allowable group of preamble sets.

Another example of such decision rules is to maintain an ordered sequence of preferred preamble sets. Transmission conditions are then determined, whereupon the list is traversed. Some transmission conditions will cause some preamble sets unsuitable for the transmission condition to be rejected, and the first preamble set in the list which is not rejected is selected to be the selected preamble set.

According to some aspects, the selecting S14 further comprises selecting S144 a preamble set based on an implemented preamble sequence detection procedure in the network node 101.

Thus, different from accounting for an implementation of a network node preamble sequence detector, a preamble sequence detection procedure is here accounted for.

In addition to the method in a wireless device, there is further disclosed herein a computer program comprising computer program code which, when executed in a wireless device 102, 102a, enables the wireless device to execute a method according to any of the aspects set forth.

Proposed Method in a Network Node

Figure 7:
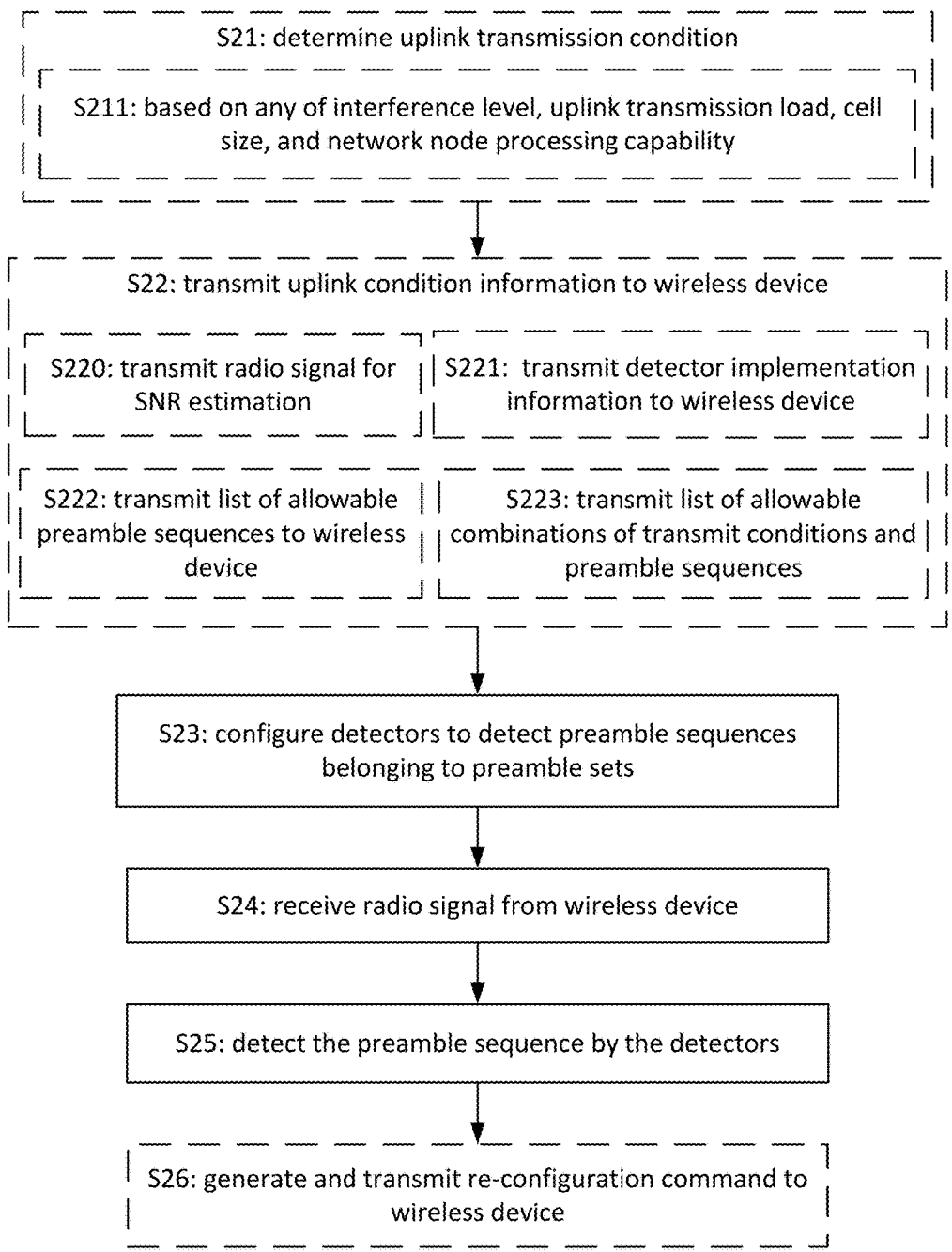
FIG. 7 is a flowchart illustrating embodiments of method steps in a network node.

FIG. 7 is a flowchart illustrating embodiments of method steps performed in a network node 101, 101b. In particular, there is shown a method in a network node 101, 101b for receiving and detecting a preamble sequence transmitted over an uplink 103 from a wireless device 102 to the network node 101, 101b. The received preamble sequence belongs to one out of two or more preamble sets.

The method comprises configuring S23, for each preamble set, a detector for detecting a preamble sequence belonging to the preamble set, wherein each preamble set is associated with at least one respective transmission condition of the uplink 103.

In this way, the number of preamble sequences that each detector needs to detect is reduced, which leads to a more efficient random access procedure and network node implementation.

Furthermore, the combinations of transmission conditions and preamble sequences that preamble sequence detectors in the network node are configured to detect is reduced by the present teaching. This reduces processing requirements in the network node, while maintaining the advantage of having several detectors tailored to different transmission conditions available in the network node.

The method further comprises receiving S24 a radio signal from the wireless device 102 over the uplink 103 comprising the preamble sequence, as well as detecting S25 the preamble sequence by the configured detectors.

According to aspects, each preamble set is further associated with at least one respective preamble sequence processing capability and/or detector implementation of the network node 101, 101b. Hence, the network node knows that the wireless device has selected preamble sequence based on the detector implementation of the network node. In this way detector performance can be improved since the actual preamble transmission can be tailored to a specific detector implementation of the receiving network node 101.

As already discussed in connection to FIG. 6 and the method steps in the wireless device, the network node, according to aspects, determines the transmission conditions on the uplink from the wireless device to the network node. Thus, according to aspects, the method comprises determining S21 a transmission condition on the uplink 103 from the wireless device to the network node 101. As transmission conditions is herein given a wide interpretation, the determining S21, according to aspects, comprises determining S211 the transmission condition as a transmission condition metric value based on any of:

a signal-to-noise ratio, SNR, condition of the uplink 103;
an interference level condition of the uplink 103;
a transmission load condition of the uplink 103;
a channel coherence time condition of the uplink 103;
a Doppler spread condition of the uplink 103;
a cell size of a cell of the network node 101;
a preamble sequence processing capability of the network node 101; and
a detector implementation of the network node 101.

As discussed in connection to FIG. 6, it is the wireless device that selects preamble set.

However, this selection is, according to aspects, guided and/or influenced by the network node. Towards this end, the method, according to aspects, comprises transmitting S22, to the wireless device 103, information related to a transmission condition of the uplink 103.

The transmitting S22, according to some aspects, comprises transmitting S220 a radio signal to the wireless device 102 allowing estimation, by the wireless device 102, of any of a signal-to-noise ratio, SNR, a channel coherence time, and a Doppler spread condition of the uplink 103.

This estimation corresponds to the indirect determining of uplink transmission conditions by the wireless device discussed in connection to FIG. 6.

The transmitting S22, according to some other aspects, comprises transmitting S221 a message to the wireless device 102 comprising information related to a preamble sequence processing capability, and/or a detector implementation of the network node 101, 101b.

The transmitting S22, according to some other aspects, comprises transmitting S222 a list of allowable preamble sequences and/or transmitting S223 a list of allowable combinations of uplink transmit conditions and preamble sequences to the wireless device 102. As discussed above, these lists allow for additional degrees of freedom for the network node 101, or for an operator of the radio access network 100, to optimize and control the random access mechanism in the radio access network 100.

During operation, a network node 101 or other network entity may discover that some of the allowable preamble sequences are over-utilized, i.e., that wireless devices use a sub-set of the allowable preamble sequences more frequently than some other preamble sequences which may be under-utilized. In this case, network performance, and random access performance in particular, can be improved by re-configuring the preamble sets such that, e.g., some often selected sets are expanded to contain additional preamble sequences.

The re-configuration command is, according to some aspects, transmitted to the wireless device from the network node. Thus, according to aspects, the method comprises generating and transmitting S26 a re-configuration command to the wireless device 102, prompting the wireless device 102 to re-configure an existing configuration of preamble sequences into new preamble sets.

In addition to the method in a network node, there is further disclosed herein a computer program comprising computer program code which, when executed in a network node, enables the network node to execute a method according to any of the aspects set forth.

Network Signaling Overview

Figure 8:
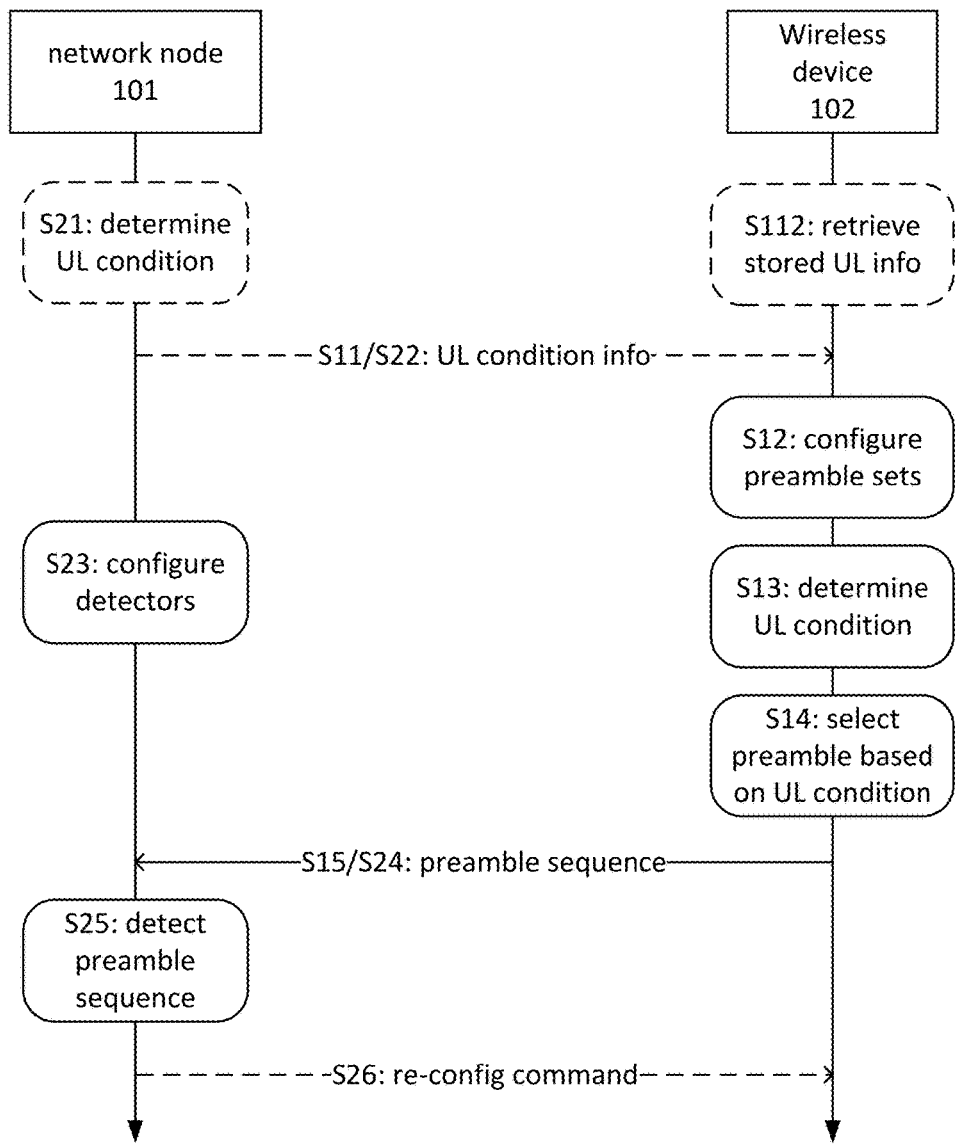
FIG. 8 is a signaling diagram illustrating aspects of an exchange of signals in a network.

In order to better understand the interworking between the method steps performed in the wireless device 102 discussed in connection to FIG. 6, and the methods steps performed in the network node 101 discussed in connection to FIG. 7, FIG. 8 shows a signaling diagram illustrating aspects of signals exchange in a network, such as the radio access network 100.

According to some aspects, the network node 101 first determines S21 transmission conditions on the uplink 103 from the wireless device 102 to the network node 101. In parallel, according to some aspects, the wireless device retrieves stored UL transmission condition information. The network node then transmits S22 UL condition information which the wireless node receives S11, whereupon the wireless device 102 is enabled to determine further uplink transmission conditions from the received radio signal.

The wireless device then proceeds to determine S13 a transmission condition of an uplink 103 from the wireless device 102 to the network node 101, and also selects S14 a preamble sequence based on the determined transmission condition, before transmitting S15 the selected preamble sequence on the uplink 103 to the network node.

In the meantime the network node 101 has configured, for each preamble set, a detector for detecting a preamble sequence belonging to the preamble set. Thus, when the network node receives S24 the preamble sequence from the wireless device 102, it is poised to detect S25 the preamble sequence.

The network node then, optionally, transmits S26 a re-configuration command to the wireless device 102.

Figure 9:
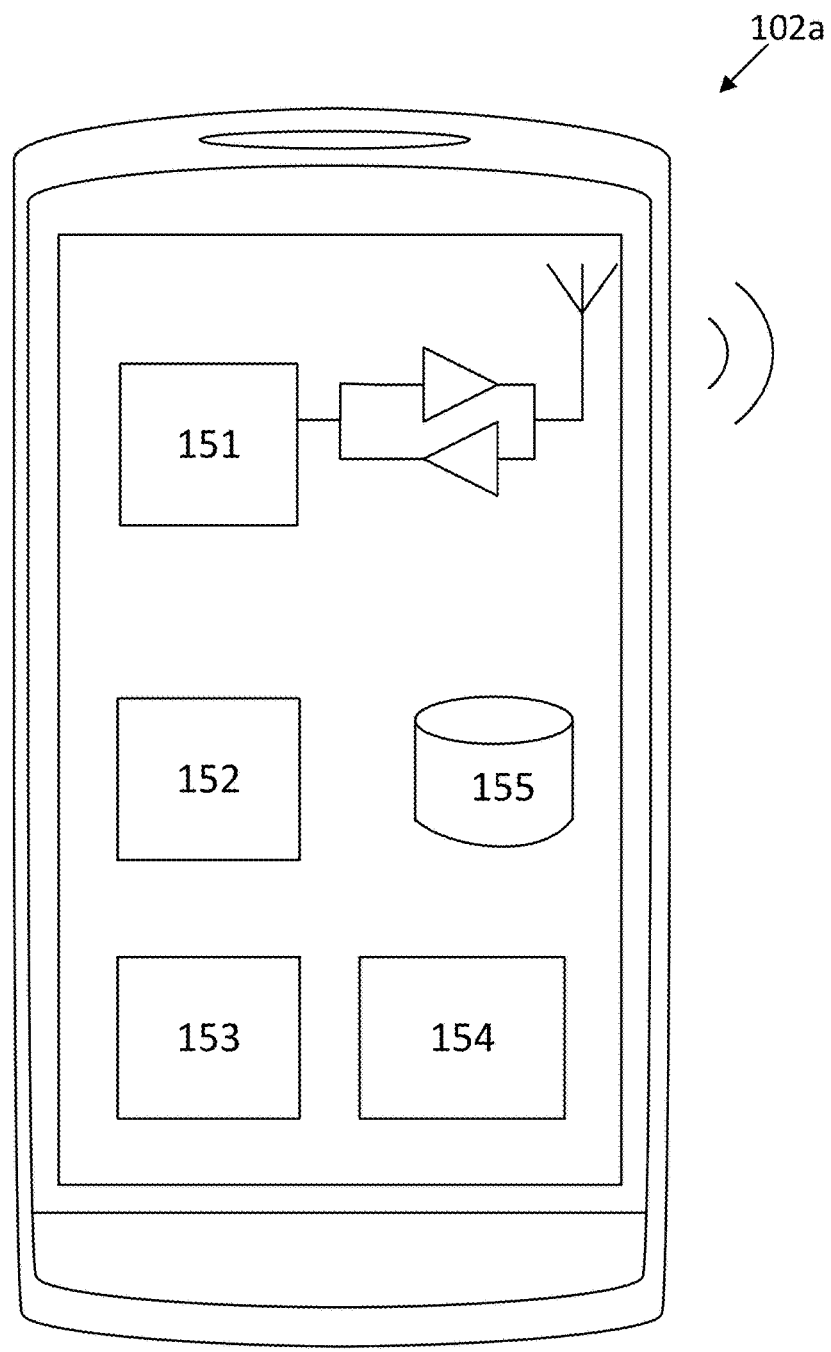
FIG. 9 is a block diagram illustrating embodiments of a wireless device.

FIG. 9 is a block diagram illustrating embodiments of a wireless device. In particular, FIG. 9 schematically illustrates a wireless device 102a arranged to transmit a preamble sequence to a network node 101. The wireless device 102a comprises a set partitioning module 152 arranged to configure a number of preamble sequences into two or more preamble sets, wherein each preamble set is associated with at least one respective uplink transmission condition, and a transmission condition determining module 153 arranged to determine a transmission condition of an uplink 103 from the wireless device 102, 102a to the network node 101. The wireless device also comprises a preamble set selection module 154 arranged to select one out of the two or more preamble sets based on the transmission condition to be a selected preamble set, and a preamble sequence from the selected preamble set to be a selected preamble sequence, as well as a communication interface 151 arranged to transmit the selected preamble sequence on the uplink 103.

Following selection of preamble set, a wireless device 102 transmits a preamble from the selected preamble set. The selection of preamble set is, according to aspects, based upon which detection procedure the network node may use. For example, one group of selected preambles with many repeated short sequences may be associated with a detection procedure that employs many FFT windows, thus gathering more signal energy than a detection procedure employing only a few FFT windows.

The first case is, according to aspects, used when the received preamble signal is expected to be weak and/or the radio uplink channel is coherent over many FFT windows, thus, in an LTE setting, the PRACH receiver can add the detected preamble energy from many FFT windows. The trade-off is that this leads to a larger delay compared to a detection procedure with fewer windows.

The second case, when only a few FFT windows are employed is, according to aspects, used when the received preamble signal on the uplink is expected to be strong or the signal processing capacity is limited in the network node. This would give faster detection compared to the first case.

On the other hand, selected preambles with few, short, repeated sequences must be associated with a detection procedure that employs few FFT windows.

Thus, according to some aspects, each preamble set is further associated with at least one respective preamble sequence processing capability and/or detector implementation of the network node 101.

In the wireless device 102, the choice of preamble set is, according to aspects, determined by the best available estimate of what the quality of the received preamble will be at the network node. Below are listed some examples of decision criteria used in aspects of the present teaching:

If the received eNB reference signal power is low, this could indicate that the received preamble power will also be low. Hence, choosing a preamble set with many repeated short sequences gives the eNB the possibility to use many FFT windows, thus gathering more received signal energy. On the contrary, if the received eNB reference signal power is high, choosing a preamble set with few repeated short sequences, associated with a detection procedure employing only a few FFT windows will give a faster detection and reduced probability of PRACH collision.

If the wireless device mobility is high, selecting a detection procedure using only a few FFT windows is likely suitable, since a high wireless device speed indicates that relying on many windows spread out in time is not feasible due to the reduced channel coherence time.

Choose a preamble set based on overall system load as this may be an indication of interference in the system. When the system load is high, choosing a preamble set with few repeated short sequences can reduce the probability of PRACH collision. When the system load is low the probability of PRACH collision is also low. Hence, the wireless device can select a preamble set with many repeated short sequences so that the PRACH receiver can gather more signal energy and preamble detection probability is optimized.

The power ramping schemes applied to the different preamble sets are, according to aspects, tailored to suit the transmission conditions on the uplink. This includes power of the initial transmission and step size of the power ramping. For example, a preamble set for which the receiver only employs a few FFT windows could be transmitted with a higher initial preamble power to compensate for this.

Thus, according to some aspects, the set partitioning module 152 is further arranged to assign a respective power ramping scheme to each of the two or more preamble sets, and the communication interface 151 is arranged to transmit the selected preamble sequence according to the respective power ramping scheme of the selected preamble set.

The different preamble sets are further, according to aspects, scheduled on different time/frequency resources with different power levels. The detection procedures for each such PRACH resource is then tailored to a specific FFT window length. This saves processing capacity in the eNB since not all detection procedures need to be applied to all PRACH resources.

According to some aspects, the eNB further, based on current traffic situation in the system, moves preambles previously assigned to one preamble set to another preamble set. The update of preambles in the preamble sets is signaled via RRC-signaling or broadcasted in the system information. For example, moving preambles with many short repeated sequences to a preamble set with few short repeated sequences can increase the PRACH capacity.

Thus, according to some aspects, the set partitioning module 152 is further arranged to re-configure an existing configuration of preamble sequences into new preamble sets based on a received re-configuration command.

In the situation when a wireless device transmits a preamble sequence with many repeated short sequences, the eNB does not have to wait for all sequences to be received. If the signal is strong enough, early detection based on a smaller number of FFT windows is possible. Hence, the eNB can spare processing capacity for other potential preambles in the remaining FFT windows.

Figure 10:
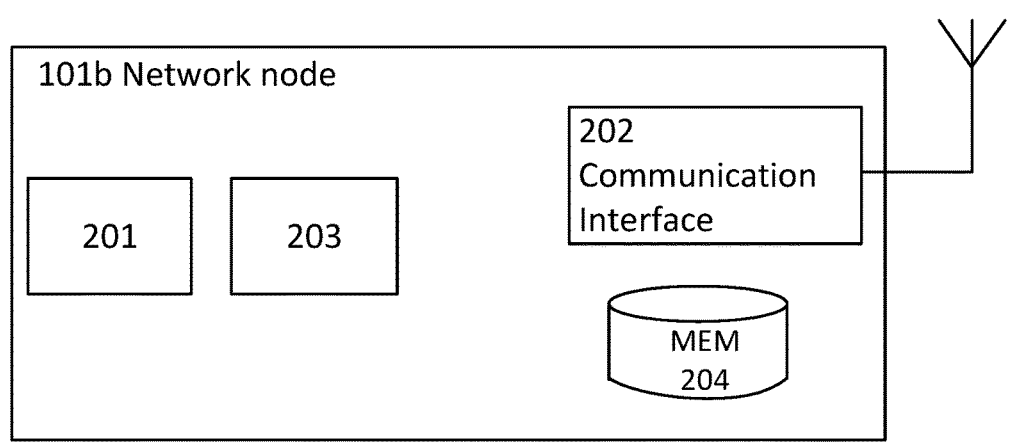
FIG. 10 is a block diagram illustrating embodiments of a network node.

FIG. 10 is a block diagram illustrating embodiments of a network node. In particular, there is shown a network node 101b arranged to receive and to detect a preamble sequence transmitted over an uplink 103 from a wireless device 102 to the network node 101b. As discussed above, the preamble sequence belongs to one out of two or more preamble sets.

The network node 101b comprises one or more detectors 201 configured to detect preamble sequences belonging to respective preamble sets, and each preamble set is associated with at least one respective transmission condition of the uplink 103, as well as a communication interface 202 arranged to receive a radio signal from the wireless device 102, over the uplink 103, comprising the preamble sequence.

According to aspects, each preamble set is further associated with at least one respective preamble sequence processing capability and/or detector implementation of the network node 101b.

According to aspects, the communication interface 202 is arranged to transmit a message to the wireless device 102 comprising information related to a preamble sequence processing capability, and/or a detector implementation of the network node 101b.

Figure 11:
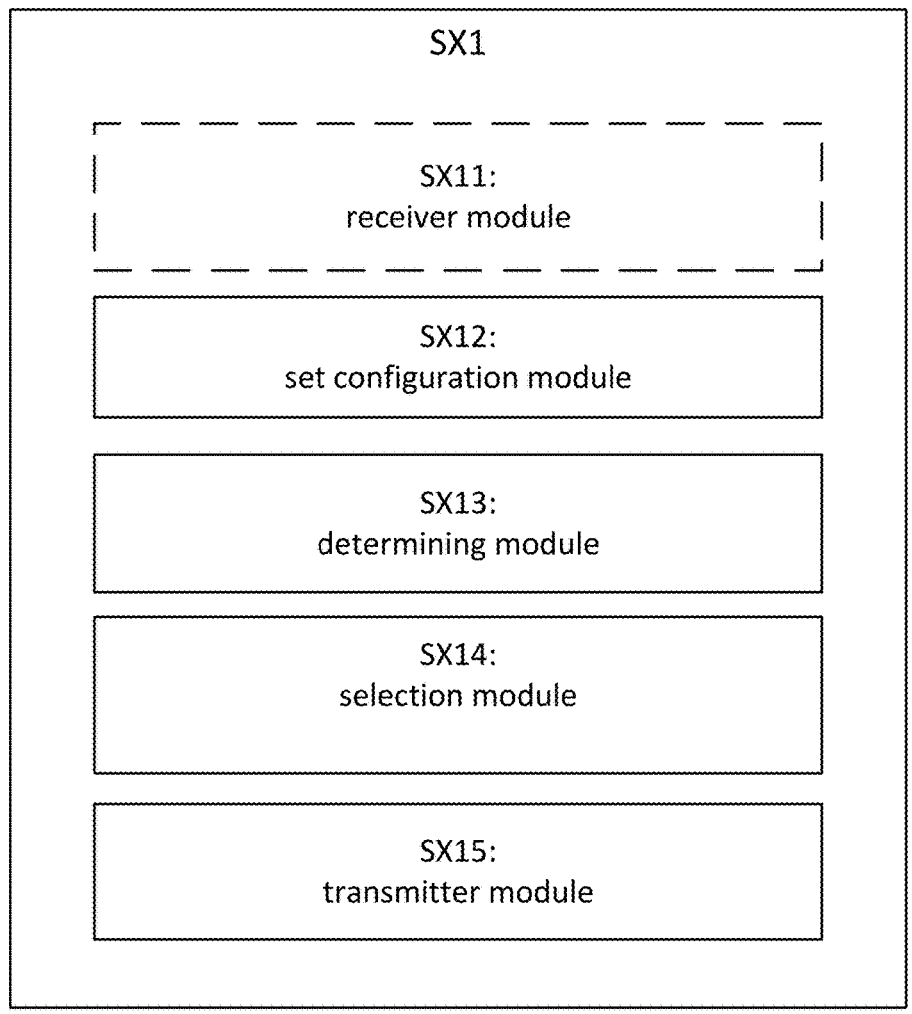
FIG. 11 is a block diagram illustrating embodiments of a wireless device.

FIG. 11 is a block diagram illustrating embodiments of a wireless device SX1 for transmitting a preamble sequence to a network node over an uplink. The wireless device comprises:

- an optional receiver module SX11 configured to receive information from a network node related to a transmission condition of the uplink;
- a set configuration module SX12 arranged to configure a number of preamble sequences into two or more preamble sets, wherein each preamble set is associated with at least one respective uplink transmission condition of the uplink;
- a determining module SX13 configured to determine a transmission condition of the uplink from the wireless device to the network node;
- a selecting module SX14 configured to select one out of the two or more preamble sets based on the determined transmission condition to be a selected preamble set, and a preamble sequence from the selected preamble set to be a selected preamble sequence; and
- a transmitter module SX15 configured to transmit the selected preamble sequence on the uplink.

Figure 12:
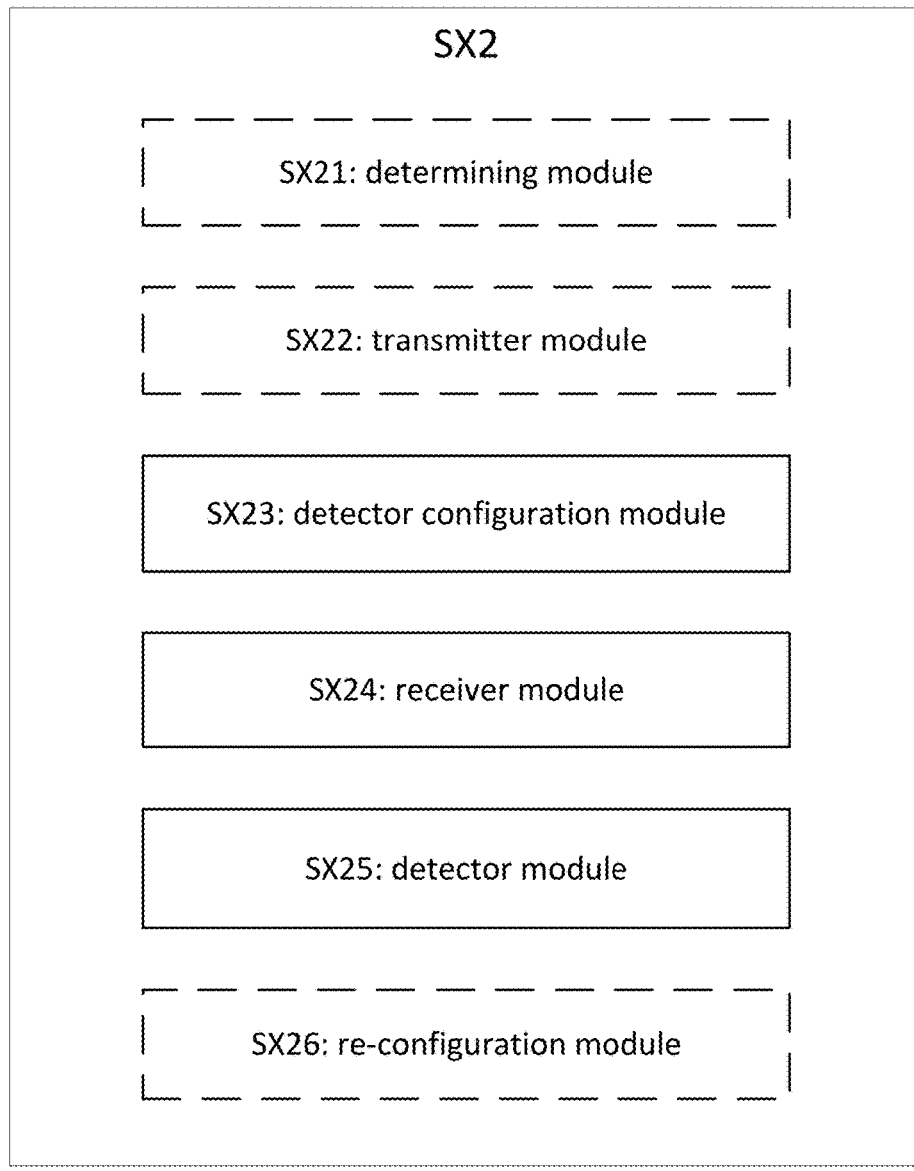
FIG. 12 is a block diagram illustrating embodiments of a network node.

FIG. 12 is a block diagram illustrating embodiments of a network node SX2 for receiving and detecting a preamble sequence transmitted over an uplink from a wireless device to the network, the network node comprises:

- an optional determining module SX21 configured to determine a transmission condition on the uplink;
- an optional transmitter module SX22 configured to transmit, to the wireless device, information related to a transmission condition of the uplink;
- a detector configuration module SX23 arranged to configure, for each preamble set, a detector for detecting a preamble sequence belonging to the preamble set, wherein each preamble set is associated with at least one respective transmission condition of the uplink;
- a receiver module SX24 configured to receive a radio signal from the wireless device over the uplink comprising the preamble sequence; and
- a detector module SX25 configured to detect the preamble sequence by the configured detectors; as well as
- an optional re-configuration module SX26 configured to generate and transmit a re-configuration command to the wireless device, prompting the wireless device to re-configure an existing configuration of preamble sequences into new preamble sets.

The invention claimed is:

1. A method in a wireless device for transmitting a preamble sequence to a network node, the method comprising:

configuring a number of preamble sequences into two or more preamble sets, wherein each preamble set is associated with at least one respective uplink transmission condition and at least one of the preamble sequences comprises a concatenation in time of one or more identical short sequences (s[n]), each of the short sequences having a same time duration (T) as an orthogonal frequency-division multiplexing, OFDM, symbol used for carrying data traffic in a radio access network of the wireless device;

determining a transmission condition of an uplink from the wireless device to the network node; and selecting one out of the two or more preamble sets based on the determined transmission condition to be a selected preamble set, and a preamble sequence from the selected preamble set to be a selected preamble sequence; as well as transmitting the selected preamble sequence on the uplink.

2. The method according to claim 1, wherein each preamble set is further associated with at least one respective preamble sequence processing capability and/or detector implementation of the network node.

3. The method according to claim 1, further comprising receiving information from the network node related to the transmission condition of the uplink.

4. The method according to claim 1, wherein the configuring further comprises configuring the preamble sequences into preamble sets based on a list of allowable preamble sequences, and/or based on a list of allowable combinations of transmission conditions and preamble sequences.

5. The method according to claim 1, wherein the configuring further comprises assigning a respective power ramping scheme to each of the two or more preamble sets, and wherein the transmitting further comprises transmitting the selected preamble sequence according to the respective power ramping scheme of the selected preamble set.

6. The method according to claim 1, wherein the configuring further comprises re-configuring an existing configuration of preamble sequences into new preamble sets based on a received re-configuration command.

7. The method according to claim 1, wherein the determining comprises determining the transmission condition as a transmission condition metric value based on any of:
- a signal-to-noise ratio, SNR, condition of the uplink;
- an interference level condition of the uplink;
- a transmission load condition of the uplink;
- a channel coherence time condition of the uplink;
- a Doppler spread condition of the uplink;
- a cell size of a cell of the network node;
- a preamble sequence processing capability of the network node; and
- a detector implementation of the network node.

8. The method according to claim 1, wherein the selecting further comprises selecting a preamble set based on a list of allowable preamble sequences, and/or based on a list of allowable combinations of transmission conditions and preamble sequences.

9. The method of claim 1 wherein each of the preamble sequences comprises the concatenation in time of the one or more identical short sequences (s[n]), each of the short sequences having the same time duration (T) as the OFDM symbol used for carrying the data traffic in the radio access network of the wireless device.

10. The method of claim 9 wherein a plurality of the preamble sequences has a different number of repetitions of the short sequences.

11. The method of claim 10 wherein a plurality of the preamble sequences has a different number of repetitions of the short sequences.

12. A method in a network node for receiving and detecting a preamble sequence transmitted over an uplink from a wireless device to the network node, the preamble sequence belonging to one out of two or more preamble sets, where each preamble set of the two or more preamble sets comprises a disjoint subset of a plurality of preamble sequences, the method comprising:
configuring, for each preamble set, a detector to detect a preamble sequence belonging to the preamble set, wherein each preamble set is associated with at least one respective transmission condition of the uplink and at least one of the plurality of preamble sequences comprises a concatenation in time of one or more identical short sequences (s[n]), each of the short sequences having a same time duration (T) as an orthogonal frequency-division multiplexing, OFDM, symbol used for carrying data traffic in a radio access network of the network node;
receiving a radio signal from the wireless device over the uplink comprising the preamble sequence;
detecting the preamble sequence by the configured detectors where the preamble sequence belongs to a preamble set of the two or more preamble sets; and
determining the at least one respective transmission condition of the uplink based on the detected preamble sequence.

13. The method according to claim 12, wherein each preamble set is further associated with at least one respective preamble sequence processing capability and/or detector implementation of the network node.

14. The method according to claim 12, further comprising transmitting, to the wireless device, information related to a transmission condition of the uplink.

15. The method according to claim 14, wherein the transmitting comprises transmitting a message to the wireless device comprising information related to a preamble sequence processing capability, and/or a detector implementation of the network node.

16. The method according to claim 14, wherein the transmitting comprises transmitting a list of allowable preamble sequences and/or a list of allowable combinations of uplink transmit conditions and preamble sequences to the wireless device.

17. The method according to claim 12, further comprising generating and transmitting a re-configuration command to the wireless device, prompting the wireless device to re-configure an existing configuration of preamble sequences into new preamble sets.

18. The method of claim 12 wherein each of the preamble sequences comprises the concatenation in time of the one or more identical short sequences (s[n]), each of the short sequences having the same time duration (T) as the OFDM symbol used for carrying the data traffic in the radio access network of the network node.

19. The method of claim 12 wherein at least two of the two or more preamble sets are associated with a different detection window.

20. A wireless device arranged to transmit a preamble sequence to a network node, the wireless device comprising:
a memory;
at least one processor configured to execute instructions stored in the memory, whereby when executed, the wireless device is configured to:
configure a number of preamble sequences into two or more preamble sets, wherein each preamble set is associated with at least one respective uplink transmission condition and at least one of the preamble sequences comprises a concatenation in time of one or more identical short sequences (s[n]), each of the short sequences having a same time duration (T) as an orthogonal frequency-division multiplexing, OFDM, symbol used for carrying data traffic in a radio access network of the wireless device;
determine a transmission condition of an uplink from the wireless device to the network node; and
select one out of the two or more preamble sets based on the transmission condition to be a selected preamble set, and a preamble sequence from the selected preamble set to be a selected preamble sequence; and
a communication interface operatively coupled to the at least one processor and arranged to transmit the selected preamble sequence on the uplink.

21. The wireless device according to claim 20, wherein each preamble set is further associated with at least one respective preamble sequence processing capability and/or detector implementation of the network node.

22. The wireless device according to claim 20, wherein the wireless device is further arranged to assign a respective power ramping scheme to each of the two or more preamble sets, and wherein the communication interface is arranged to transmit the selected preamble sequence according to the respective power ramping scheme of the selected preamble set.

23. The wireless device according to claim 20, wherein the wireless device is further arranged to re-configure an existing configuration of preamble sequences into new preamble sets based on a received re-configuration command.

24. The wireless device of claim 20 wherein each of the preamble sequences comprises the concatenation in time of the one or more identical short sequences (s[n]), each of the short sequences having the same time duration (T) as the OFDM symbol used for carrying the data traffic in the radio access network of the wireless device.

25. The wireless device of claim 24 wherein a plurality of the preamble sequences has a different number of repetitions of the short sequences.

26. A network node arranged to receive and to detect a preamble sequence transmitted over an uplink from a wireless device to the network node, the preamble sequence belonging to one out of two or more preamble sets, where each preamble set of the two or more preamble sets comprises a disjoint subset of a plurality of preamble sequences, the network node comprising:
a memory; and
at least one processor configured to execute instructions stored in the memory, whereby when executed, the network node is configured to:
detect, via one or more detectors, preamble sequences belonging to respective preamble sets, wherein each preamble set is associated with at least one respective transmission condition of the uplink and at least one of the plurality of preamble sequences comprises a concatenation in time of one or more identical short sequences (s[n]), each of the short sequences having a same time duration (T) as an orthogonal frequency-division multiplexing, OFDM, symbol used for carrying data traffic in a radio access network of the network node;
receive, via a communication interface, a radio signal from the wireless device, over the uplink, comprising the preamble sequence.

27. The network node according to claim 26, wherein each preamble set is further associated with at least one respective preamble sequence processing capability and/or detector implementation of the network node.

28. The network node according to claim 26, wherein the communication interface is arranged to transmit a message to the wireless device comprising information related to a preamble sequence processing capability, and/or a detector implementation of the network node.

29. The network node of claim 26 wherein each of the preamble sequences comprises the concatenation in time of the one or more identical short sequences (s[n]), each of the short sequences having the same time duration (T) as the OFDM symbol used for carrying the data traffic in the radio access network of the network node.

30. The network node of claim 29 wherein a plurality of the preamble sequences has a different number of repetitions of the short sequences.

31. The network node of claim 26 wherein at least two of the two or more preamble sets are associated with a different detection window.

\* \* \* \* \*